(12) United States Patent
Batts-Gowins

(10) Patent No.: US 7,508,163 B2
(45) Date of Patent: Mar. 24, 2009

(54) PORTABLE AC POWER SUPPLY WITH MULTIPLE USES

(76) Inventor: Carolyn Batts-Gowins, 6305 Silk Hope Gum Springs Rd., Siler City, NC (US) 27344

(*) Notice: Subject to any disclaimer, the term of this patent is extended or adjusted under 35 U.S.C. 154(b) by 81 days.

(21) Appl. No.: 10/718,437

(22) Filed: Nov. 20, 2003

(65) Prior Publication Data
US 2004/0239287 A1   Dec. 2, 2004

Related U.S. Application Data

(63) Continuation-in-part of application No. 09/859,993, filed on May 17, 2001, now abandoned.

(51) Int. Cl.
H02J 7/00 (2006.01)
(52) U.S. Cl. .................. 320/105; 320/112; 320/113; 439/504
(58) Field of Classification Search .............. 320/61, 320/107, 112, 102, 109, 105; 429/170, 187, 429/180–181
See application file for complete search history.

(56) References Cited
U.S. PATENT DOCUMENTS

| | | | |
|---|---|---|---|
| 5,111,127 A * | 5/1992 | Johnson | 320/101 |
| 5,793,185 A * | 8/1998 | Prelec et al. | 320/104 |
| 6,252,378 B1 * | 6/2001 | Crass et al. | 320/132 |

* cited by examiner

Primary Examiner—Rajnikant B Patel
(74) Attorney, Agent, or Firm—Denison & Assocs, PC; JoAnne M. Denison; Frank O'Hare

(57) ABSTRACT

The present invention consists of a highly versatile AC portable power supply which can be used in a variety of situations to power 110 V AC common household devices, including holiday lighting or driveway or path lighting. It can also be used to jump start a dead vehicle battery either by a trickle charge via the vehicle's lighter outlet. The portable AC unit is provided with at least 3 sets of recharging plugs so that the user can recharge it with solar panels, or 110 V standard household current or 12 V vehicle battery. The portable AC unit is also provided with a timer to automatically turn it on and off at a preset time. In addition, it is provided with a display unit which can display the time left until recharge is needed, and when it is being recharged, how long it will take to fully charge.

5 Claims, 3 Drawing Sheets

PORTABLE AC POWER SUPPLY WITH MULTIPLE USES

This application is a continuation in part of copending application Ser. No. 09/859,993 (prior), filed May 17, 2001 now abandoned.

FIELD OF THE INVENTION

The present invention relates to the field of 110 V AC portable power supplies and more particularly those which are adopted to a variety of purposes, such as starting a dead car battery, illuminating holiday decorations for an extended period of time, or using with other household uses where a normal AC outlet is not readily available.

BACKGROUND OF THE INVENTION

Currently, in the marketplace, there are not many portable AC power supplies. Most notably, there is nothing to illuminate holiday decorations for a definite period of time which are located a distance from outlets. Sometimes it is difficult or impossible to string an extension cord to remote locations about the perimeter of one's house. There is certainly no portable AC supply which is provided with a timer to turn lights on and off at a preset time which could avoid the use of an extension cord over long distances. There is no portable AC power supply which can be used in remote locations as for camping or picnicing which can supply power to a radio or TV.

In reviewing the prior art, there are portable power supplies which are bulky or not easy to use. One such invention is disclosed in U.S. Pat. No. 5,111,127 issued to Johnson and U.S. Pat. No. 2,978,596 issued to Robirds which disclose very bulky power suppies which are used to power tools at remote locations around a job site. In these inventions is used a DC rechargeable battery which is equipped with an DC to AC converter which can function as a 110V AC current supply. Of course, the unit is charged by plugging it into an AC power supply and uses an AC to DC converter to charge the internal battery.

One interesting invention, U.S. Pat. No. 3,919,615 issued to R. Niecke, discloses the use of a specialized power belt which can carry batteries which are used to supply power to a variety of portable power tools equipped with special plugs.

Other issued patents, such as U.S. Pat. No. 5,369,565 issued to I. Chen disclose AC powered devices which can be used with a DC battery, but they are provided with specialized plugs so that they can be used only with a vehicle cigarette lighter opening and are only powered or recharged with the energy supplied by the 12 V from a car battery and hence cannot be used in a variety of situations.

However, none of the inventions seen in the prior art discloses the use of a simple, lightweight power supply which can be used in a multiple of situations in a convenient and safe manner, as does the present invention.

SUMMARY OF THE INVENTION

The present invention consists of a portable AC power supply having a standard three prong outlet with a safety interrupt circuit which is intended to be used in outdoor as well as indoor conditions. The portable AC power supply is lightweight in nature and can be powered by a highly efficient NiCad or similar rechargeable battery. The AC power supply is provided with a detachable car lighter plug so that it can easily convert the 12 Volts from a vehicle's battery into 110 Volts for use with a standard household appliance such as a TV, radio, CD player and the like. It may also be recharged by the vehicle's battery by simply pushing a button. Or, when recharged, it can also jump start a vehicle by providing a trickle charge back into the car's battery by use of the vehicle's lighter plug.

The portable AC power supply can also be supplied with a timer for outdoor use when a homeowner desires to use lighting or decorations in special places which are far from an outlet so as to avoid use of extension plugs which can be dangerous when people trip over them or which may overload circuits. Further, it is anticipated that additional units may be ganged together so that the device can provide extended life in situations where this is desired. Solar panels can also be provided as an option which can merely plug into the device to recharge it when it is used in sunny, outdoor situations.

And finally, it is anticipated that the AC power supply is completely water resistant and rugged such that it can be used in camping or other outdoor situations where water may be present, or it may be raining or snowing. It can be used on job sites to power standard power tools. In short, the present invention comprises a highly adaptable, versatile tool which can provide short term or long term power in a variety of situations.

OBJECTS OF THE INVENTION

Thus, it is one primary object of the present invention to provide a portable AC power supply in which the device can be charged in different fashions, including solar panels, a charge from a vehicle through its lighter outlet, or through a traditional AC to DC power converter which is supplied internally in the device.

It is yet another primary object of the present invention to provide a portable AC power supply with a time which allows it to go on at a preset time and be turned off at yet at least another preset time.

It is still another primary object of the present invention to provide a portable AC power supply with a GFI outlet or safety interrupt which is a safety device which will turn off the unit automatically when it senses that the device to which it is connected with has shorted itself out.

It is another primary object of the present invention to provide electrical connecting pins on the front and back or each unit and physical connecting means so that two or more of the portable AC power supplies can be ganged together to provided extended power service when necessary.

It is still yet another primary object of the present invention to provide a display unit which can display the current power consumption of the device, the relative power storage level of the unit and the resultant expectant life of the power supply in hours and minutes so that the user can reasonably anticipate the need to recharge the unit and know in advance how much time is left to the next recharge.

It is still another primary object of the present invention to calculate while the unit is recharging, how much additional time is required for a full charge and display this calculated value in hours and minutes to the user of the device, based upon the type of recharging chosen, be it through solar panels, a standard 110 Volt outlet or a 12 V DC vehicle battery.

These and other objects and advantages of the present invention can be readily derived from the following detailed description of the drawings taken in conjunction with the

BRIEF DESCRIPTIONS OF THE DRAWINGS

DETAILED DESCRIPTION OF THE DRAWINGS

Figure 1:
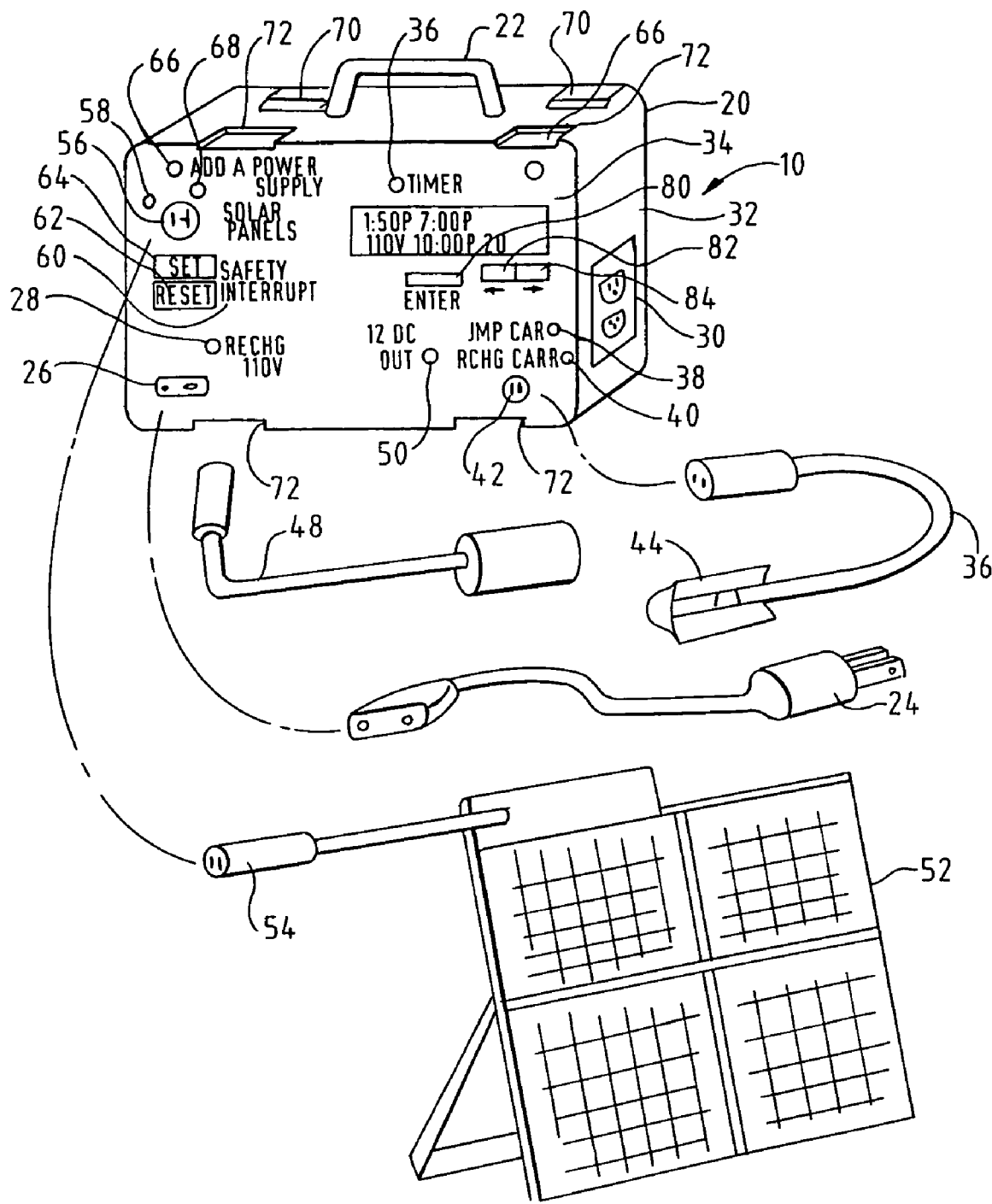
FIG. 1 is a perspective view of the present invention, multi-use power supply showing some of its specialized features for convenient 110 AC power supply recharging.

Shown now in FIG. 1 is a perspective view of the present invention showing multi-use power supply 10. Shown in this drawing are housing 20 and handle 22 which is used for convenient carrying of the device since it is intended that the device be completely portable. In the interior of the device are at least one high highly efficient rechargeable batteries, preferably NiCAD, or any other efficient rechargeable battery, commonly available in the market place.

The device may be charged is using a recharging cable 24 which can plug into a standard household outlet to charge the interior battery or batteries. Common charging times are expected to be 18 to 24 hours for a full charge. This recharging cable 24 is removably installed into pin 110 V outlet 26. When the user desires to recharge the device, she or he will toggle on select button 28 which is located near the pin 110 V outlet 26.

After the multi-use power supply 10 has been properly charged then the user may begin use of the device. If the user desires, the dual 110 V AC outlets 30 located on the side of multi-use power supply 10 may be used by plugging in any standard household appliance, tool or other electric device into 110 V AC outlets 30 and by toggling on select button 32 which is located directly adjacent the 110 V AC outlets. Of course, if the user desires, the use of these 110 V AC outlets can be timed by setting a timer on the device. A display LED 34 is provided which can display current time, current voltage setting, at least one start time and one end time, estimated hours of battery life based upon current voltage and last battery charge time, and estimated time remaining to fully charge the device. In this particular instance, the display LED 34 shows that it is currently 1:50 pm, that the device will turn on at 7:00 pm and will shut off at 10:00 pm. These would appear to be typical settings for holiday decorations or outside walk lights where an outlet is not available. The timer circuit is turned on when the select button 36 is toggled on by the user. The display LED 34 also shows that there is 2.0 hours of battery life estimated left in the device. When the unit is charging, it will display the amount of time remaining to provide a full charge to the battery.

With the present invention, if the user desires to jump her or his vehicle, this will be made entirely possible by connecting car jumper cable 36 to pin 12 V outlet 42. Car jumper cable 36 is provided with a standard car cigarette lighter adapter 44 at one end which can be plugged into the car's cigarette lighter adapter 44 at one end which can be plugged into the car's cigarette lighter opening when the use desires to either jump start a car or to charge multi use power supply 10 from the electric power provided by the car's battery or electrical system. When select button 28 is toggled on by the user, the user can jump a car. When select button 40 is toggled on by the user, then the user can recharge multi-use power supply by plugging in cigarette lighter adapter 44 into the opening provided in a vehicle for the vehicle's cigarette lighter.

In some instances a user may desire to use a device which has a car cigarette light adapter jack (similar to that shown on jumper cable 36 as cigarette lighter adopter plug 44) which is intended to be plugged directly into a vehicle's cigarette lighter opening, but at some distance away from the vehicle. In that instance, the user would use jumper cable 48 which also may be plugged into 12 V pin outlet 42 shown on the device. However, in this instance, selector button 50 is toggled on by the user to provide 12 V of DC power out to jumper cable 48 so that the user can plug in a cell phone with a car lighter jack, or a computer, shaver, etc., simply and directly without the use of a further 12 V adapter and 110 V plug.

Also shown on multi-use power supply 10 is an additional option wherein a folding solar panel unit 52 is provided with jumper cable 54 which can be plugged into pin outlet 56. It should be noted that in this case the solar panel unit is hinged so that it can be conveniently folded up for storage or it may be more easily transported. The multi-use power supply 10 will then trickle charge with about 500 to 800 mA when in use and placed in full sun. It should be noted that pin outlet 56 is different from pin outlet 42 so that the user will not become confused as to which jumper cable is used where. The solar panel 52 option is operated by the user by toggling on select button 58 when this option is desired to be used.

When the multi-use power supply 10 is used with 110 V, a safety interrupt circuit 60 is also provided. Should the multi-use power supply 10 detect a short circuit or circuit overload from the 110 V AC outlets 30, the unit will automatically shut off and the user will need to correct the problem and then reset the device by pressing on reset button 62. To test the effectiveness of the safety interrupt system 60, the user will be able to press test button 64 to see if an electrical device plugged into 110 V AC outlets 30 will shut off. The multi-use power supply 10 can then be reset by pressing reset button 60.

Figure 2:
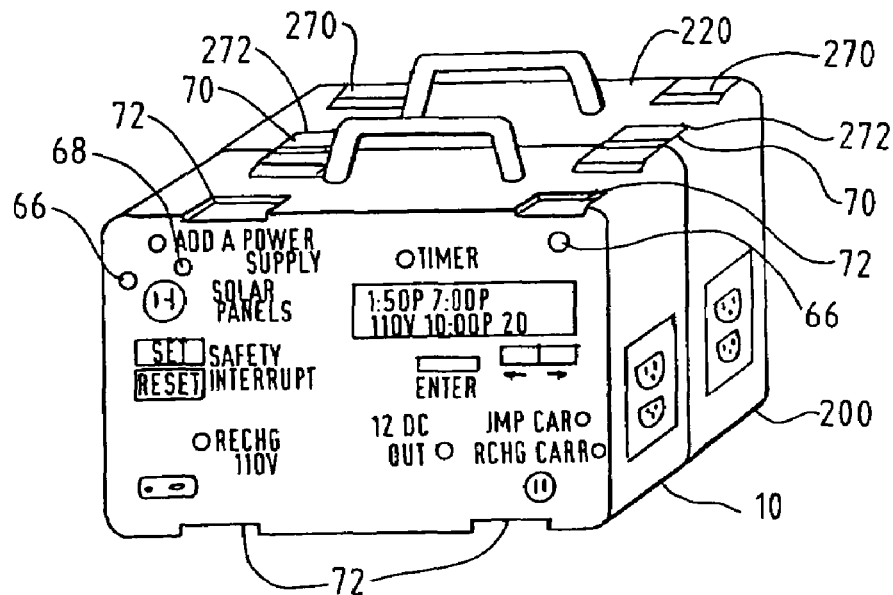
FIG. 2 is a perspective view of the present invention, with two multi-use power supplies connected together so as to provide power for an extended period of time.

As an additional option, multi-use power supply 10 may be provided with electrical connector elements 66 that allow two or more of such devices to be ganged together, front and back, as shown in FIG. 2. Power is transferred between units by the electrical connector elements 66 which are shown both in FIGS. 1 and 2. One of the electrical connector elements 66 on the front of the device is positive while the other is negative. Corresponding electrical connector elements are to be found on the bock of each multi-use power supply 10, so that they may properly engage with the electrical connector elements on the front of the multi-use power supply 200 which is connected directly behind it.

The multi-use power supplies 10 and 200 shown in FIG. 2 are physically connected together by means of slidably engaging tongues 70 located in the posterior top and bottom of multi-use power supply 200 which are adopted to slidably engage with grooves 272 which are located in the anterior top and bottom of multi-use power supply 200. When not in use, the tongues 70 and 270 are tucked into housings 20 and 220, but when in use they can slidably engage and lock into corresponding grooves located on the front of the power supply to be added. In such a manner, the life of one power supply can be greatly extended where the user needs power for a longer amount of time. After multi-use supply units have been ganged together and tongues 70 have been locked into groove 272 located on the front top and bottom of multi-use power supply 200, the user can then toggle on button 68 to draw the additional power through contact elements 66.

Figure 3:
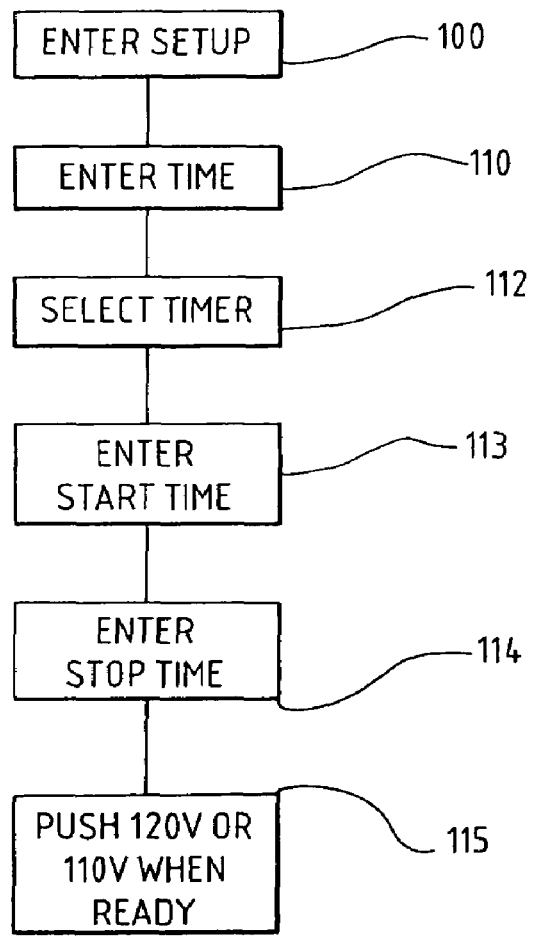
FIG. 3 is a flow chart of the steps involved to set up the timer mechanism for the present invention.

FIG. 3 illustrates is flow chart form how the timer and clock is set for multi-use power supply 10. In this case, as shown in FIG. 1, the enter button 80 is used to select the function, while decrease and increase buttons 82 and 84 are used to increase or decrease numeric variables on the LED display face 34. The set up procedure of multi-use power supply 10 is accomplished as follows. As soon as the user selects any of the myraid of select buttons on the face of the device, the LED display face 34 will enter into the set up mode 100 shown in FIG. 3. The LED will display "enter time" 110 and it will flash on the first numeral of the time to be set and the user will use the decrease and increase buttons 82 and 84 to set the first numeral and will push the enter button 80 again, at which time the second numeral of the time to be set will flash. The user will continue on with this procedure until the current time is set. Next, when the user presses the timer button 36 to select use of the timer circuitry 112, this will toggle on th timer circuit and the multi-use power supply will ask the user for the start time 113 and the user will enter that in a similar fashion by using the enter button 80 and the decrease and increase buttons 82 and 84 until this is accomplished. The user will then be prompted to enter the stop time 114, and this task will be accomplished in a similar fashion with the enter, increase and decrease buttons, 80, 82 and 84. When this is all done, the multi-use power supply 10 will request that the user select the voltage desired 115, and as soon as the user does this, the unit will start the time and timer circuit, turning the device on and off at the proper time set each day for this task. By using the solar panel feature, the user can place a set of night lights near driveways and walkways at night and the unit will charge itself during the day and then turn on the night lights at specific times each night for safety, all without the need for household current or an outlet nearby.

Figure 4:
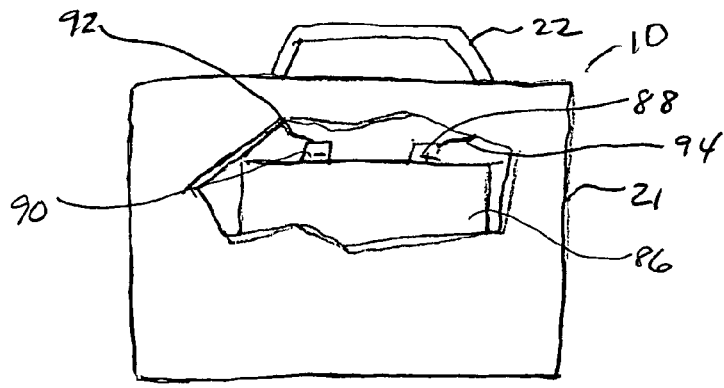
FIG. 4 is an elevation broken away view of the interior of the present invention

Shown in FIG. 4 is multi-use power supply 10 with housing rear 21 and handle 22. In the broken away view are shown battery 86 with positive end terminal 88 and negative end terminal 90. These end terminal are connected to their respective lead wires, negative lead wire 92 and positive lead wire 94. The lead wires will connect to circuitry that runs the electronics for the charging of the battery, battery output, the clock and the timer circuit.

Figure 5:
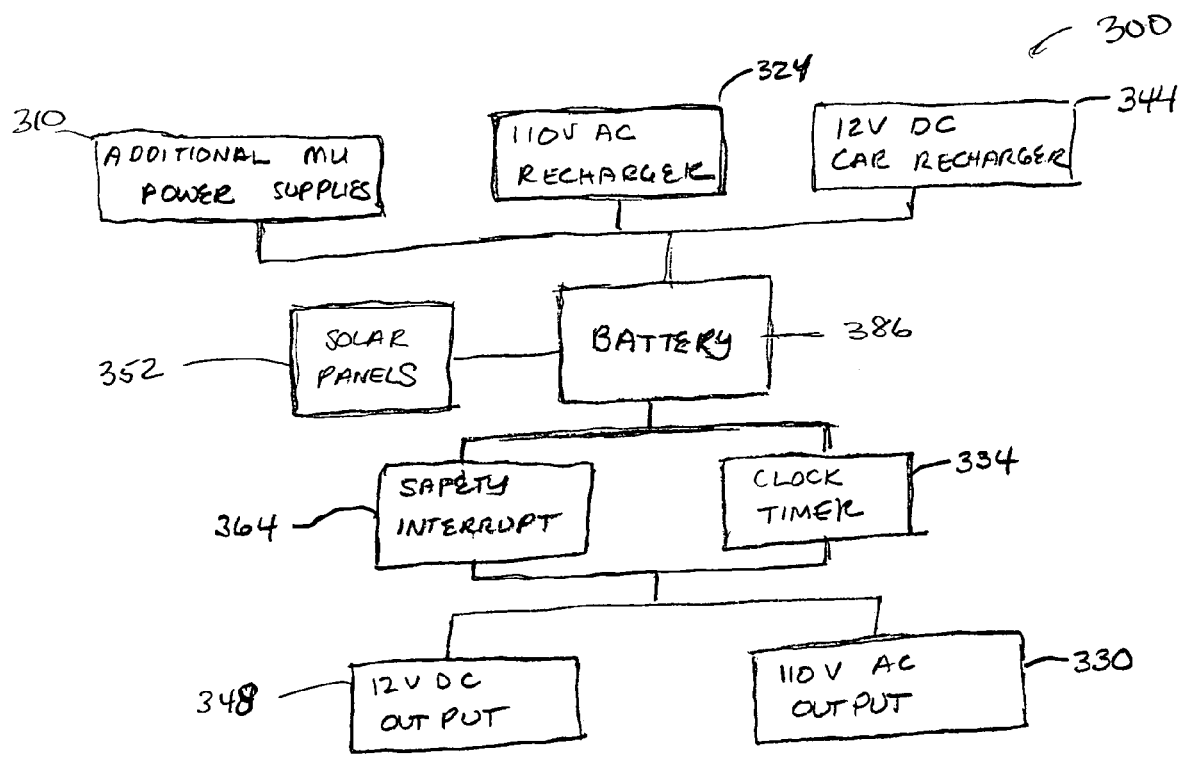
FIG. 5 is a flow charge showing the arrangements of components of the present invention.

Shown in FIG. 5 is a flow chart 300 which depicts the interconnections of the various components of one preferred embodiment of the present invention, multi-use power supply 10. At the top of flow chart 300 is shown how there are four different ways by which battery 386 may obtain a charge input, namely, via additional multi-use power supplies 310, or 110 volt AC current recharge 324, or 12V DC current car recharge 344 when car is on, or even via connected solar panels 352, which would provide a trickle charge. Also shown in this figure is how battery 386 may output its power in two different ways, namely via a 12 volt DC output 348 by means of a car adapter, such as to recharge or jump start a discharge car battery, or via 110 volt AC output 330 which connects to a standard outlet and can be used to illuminate holiday decorations, or used as a portable camp light, etc. Of course a safety interrupt 364 and a clock timer 334 can shut off power to both 12 volt DC output 334 or 110 volt AC output 330, as desired by the user of the present invention.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

The invention claimed is:

1. A multiple use electrical distribution device having a housing and a handle for carrying the device, and additionally having;
   at least one rechargeable power storage unit contained in the housing;
   at least one standard 110 V outlet adopted to receive a electrical plug for an ordinary household appliance or device,
   a clock circuit and LED display unit capable of displaying the current time;
   a timer circuit and a timer switch which can cut off flow of electricity to the 110 V outlet after a predetermined amount of time; and,
   a safety interrupt device connected to the 110 V outlet which can cut off the 110 V outlet whenever a short circuit is detected.

2. The electrical distribution device according to claim 1 further having a 12 V outlet capable of receiving a first connecter and a jumper cable having a corresponding second connecter for communicating with the device at one end and a car adopter connecter at the other end of the cable wherein the jumper cable can be used to jump a dead car battery, or when the vehicle is on, the vehicle will charge the electrical distribution device's rechargeable power storage unit.

3. The electrical distribution device according to claim 1 further having a low voltage outlet capable of receiving a first connector and a jumper cable having a corresponding second connector for communicating with the device at one end and a solar panel unit connected to the other end of the cable wherein the jumper cable can be used to recharge the electrical distribution device.

4. The electrical distribution device according to claim 1 further having a 12 V outlet capable of receiving a first connector and a jumper cable having a corresponding second connector for communicating with the device and a car adapter receptacle at the other end of the device wherein a car adapter plug can communicate with the device to provide power to a cell phone anywhere.

5. The electrical distribution device according to claim 1 wherein 2 or more such devices are provided, each having at least one physical interconnecting means communicating with its housing and at least two electrical connector means, wherein when the 2 or more electrical distribution devices are joined with their respective physical connecting means joined together and their electrical connector means are also joined together additional power and/or battery life may be provided from all of the electrical distribution devices which have been joined together.

* * * * *